(No Model.)
H. SCHAFER.
BICYCLE PROPELLING MECHANISM.
No. 595,460.  Patented Dec. 14, 1897.
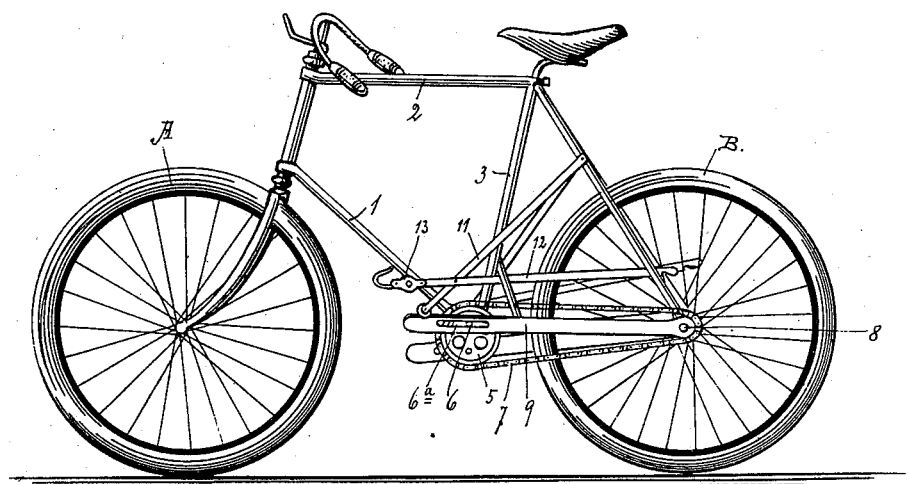
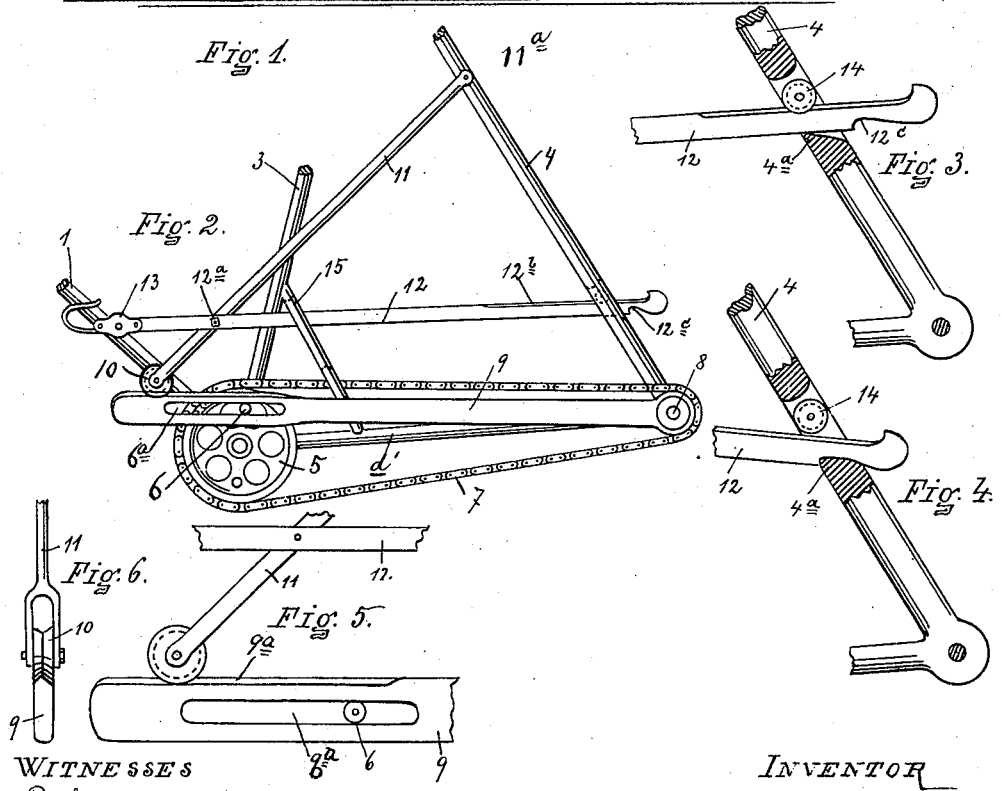
WITNESSES
Rich. A. George.
Phebe A. Tanner.
INVENTOR
HENRY SCHAFER
BY Milton E. Robinson
ATTORNEY

UNITED STATES PATENT OFFICE.

HENRY SCHAFER, OF UTICA, NEW YORK.

BICYCLE-PROPELLING MECHANISM.

SPECIFICATION forming part of Letters Patent No. 595,460, dated December 14, 1897.

Application filed July 29, 1897. Serial No. 646,326. (No model.)

*To all whom it may concern:*

Be it known that I, HENRY SCHAFER, of Utica, in the county of Oneida and State of New York, have invented certain new and useful Improvements in Bicycle-Propelling Mechanism; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

In the drawings, Figure 1 shows a side elevation of a bicycle having my improved mechanism applied. Fig. 2 shows portions of a bicycle-frame in connection with my driving mechanism on an enlarged scale. Fig. 3 shows the details, partially in sections, of a connection between the bicycle-frame and a treadle-bar constituting one of the elements of my driving mechanism. Fig. 4 shows the same as Fig. 3 with the parts in a changed position. Fig. 5 shows the details of the connection between the crank-bar and treadle hanger-bar, showing particularly a track on which a roller runs and a slot for the crank-pin. Fig. 6 is an end view of a portion of Fig. 5, showing particularly the V-shaped roller and the V-shaped track on which it runs.

Referring to the reference letters and figures in a more particular description of the device, 1, 2, 3, and 4 indicate bars of the frame of a bicycle of the usual diamond-shaped construction, in which is supported the forward wheel A and the rear wheel B in the usual manner. In the lower portion of the frame is carried on a short shaft the driving sprocket-wheel 5. The shaft has on each end a crank, one of which is shown and indicated by 6. The driving-sprocket 5 is connected with sprocket on the rear wheel B by the sprocket-chain 7. Pivoted at 8 at the center of the rear wheel B is a crank-bar 9, having a slot $6^a$, which receives the crank-pin 6. On the swinging end of the crank-bar 9 is provided a V-shaped track $9^a$, on which is adapted to run the grooved roller 10. The grooved roller 10 is carried on the lower end of the treadle hanger-bar 11, the upper end of this bar 11 being pivoted to the frame at $11^a$. The treadle-bar 12 is pivoted to the treadle hanger-bar at $12^a$ and is provided with a treadle 13 at one end, which treadle also preferably includes a toe-clip, as shown, and is provided on the rear end with a V-shaped track $12^b$, similar to the track $9^a$. The track portion $12^b$ of the treadle-lever 12 operates against the grooved roller 14, provided in an opening or side attachment in the rear frame-bar 4, as shown. The end of the treadle-lever 12 passes through the opening or side attachment containing roller 14 and is adapted to move backward and forward therein, as hereinafter described. The rear end of the treadle-lever 12 is also provided with a hook, notch, or recess $12^c$, adapted to catch onto the fixed lower portion $4^a$ of the frame-bar or side attachment below the opening containing the roller 14, as hereinafter particularly described.

It will be understood that a duplicate set of levers 9, 11, and 12, each having their various features, are provided on each side of the machine.

The operation of the device is substantially as follows: In propelling the machine the operator depresses the swinging end of one of the levers 12 and then the other in the usual manner of operating bicycles by treadle. In depressing the lever 12 by the foot applied to the treadle 13 the roller 10 is forced upon the top of the crank-lever 9, and the power is transmitted thereby to the crank 6 and through the crank by the sprocket wheel and chain to the driving-wheel B, as will be readily understood from the drawings. In the revolution of the crank-shaft the crank-pin 6 travels backward and forward along the slot $6^a$ in the crank-bar and is preferably provided with a roller to reduce the friction at this point. In the upward movement of the crank 6 the crank-bar 9, the treadle-bar 12, and the treadle hanger-bar 11 will move from the lower to the upper position. It will be observed that as the treadle 13 descends the rear end of the treadle-bar 12 passes rearwardly through the opening containing the roller 14 in the frame or side attachment, and on account of the position of the treadle 13 with reference to the pivot $12^a$ the tendency of the lever 12 at its rear end is to swing upward against the roller 14, which reduces the friction at this point.

When the machine is in motion, as in the descent of a grade, or, for that matter, at any time, the operator, having his toe engaged under the toe-clip of the treadle 13, can throw the treadle-bar 12 and hanger-bar 11 out of operation by moving his foot forwardly and upwardly until the hook or catch 12$^c$ engages on the tooth-like fixed portion 4$^a$ of the frame or attachment, where it becomes caught, and the operator may then rest his feet firmly on the treadle without interfering with the motion of the machine. The operator can also readily bring the mechanism again into operation and disengage the hook 12$^c$ from the fixed catch by forcing the treadle forward and then slightly depressing it. In order to bring roller 10 with certainty onto the track 9$^a$ of the crank-bar after having been removed therefrom, as described, I provide a guide-bar 15, which may be slotted or not to receive the bar 12 and guide the parts, as stated. The guide-bar 15 may be supported between the frame-bar 3 and the lower frame-bar $d$, as shown, or the position of this bar may be changed, so as to engage with the treadle-bar either forward or rearward of the position in which it is shown.

It will be noted that the mechanism may be also used in what is known as "back-pedaling," if desired, in retarding the movement of the bicycle. When the pedals and propelling mechanism are thrown out of operation, as before described, they do not in any way interfere with the running of the bicycle and at the same time furnish a convenient and agreeable foot-rest.

What I claim as new, and desire to secure by Letters Patent, is—

1. In a bicycle-propelling device, a crank-shaft having a crank, a crank-bar pivoted at one end, engaging with the crank and having a track thereon at the other, a treadle-bar having a treadle at one end and slidingly engaged with the frame at the other, and a treadle hanger-bar pivoted to the frame at one end and having a roller adapted to engage on the track of the crank-bar at the other end and pivoted between to the treadle-lever combined, substantially as set forth.

2. In a bicycle-propelling device, a crank-shaft and a crank, a crank-bar 9 pivoted to the frame at one end and engaging with the crank by a slot at the other and having a track 9$^a$ thereon, a treadle-lever 12 slidingly connected with the frame at one end and provided with a treadle at the other and a treadle hanger-bar 11 pivoted to the frame at 11$^a$ and to the treadle-lever at 12$^a$ and provided with a roller running on the track 9$^a$ of the crank-bar combined, substantially as set forth.

3. The combination in a bicycle-driving mechanism of the crank-bar 9, pivoted to the frame and engaging with the crank, the treadle-bar 12 and treadle hanger-bar 11, pivoted together as shown, the treadle-bar being slidingly engaged with the frame and the hanger-bar being pivotally engaged with the frame and a roller connection between the crank and treadle mechanism, substantially as set forth.

4. The combination in a bicycle-driving mechanism of the crank, a crank-bar 9, pivoted to the frame and engaging with the crank, a treadle-lever 12 slidingly engaging with the frame and provided with a treadle, and a treadle hanger-bar 11 pivoted to the frame and pivoted to the treadle-bar and having a roller connection between itself and the crank-bar, the treadle-bar having a hook adapted to engage with the frame and support the treadle mechanism and treadle out of operative position, substantially as set forth.

In witness whereof I have affixed my signature in presence of two witnesses.

HENRY SCHAFER.

Witnesses:
RICHARD A. GEORGE,
PHEBE A. TANNER.